United States Patent
Den Boer et al.

(10) Patent No.: US 10,448,487 B2
(45) Date of Patent: Oct. 15, 2019

(54) DRIVER MODULE FOR POWERING A LIGHT SOURCE AND A FURTHER MODULE

(71) Applicant: SIGNIFY HOLDING B.V., Eindhoven (NL)

(72) Inventors: Reinier Imre Anton Den Boer, Eindhoven (NL); Adrianus Maria Goijaerts, Eindhoven (NL); Yves Sebastien Boulin, Eindhoven (NL); Biju Kumar Sreedharan Nair, Eindhoven (NL); Robert Eugenio Marie Geertman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/551,850

(22) PCT Filed: Feb. 12, 2016

(86) PCT No.: PCT/EP2016/053055
§ 371 (c)(1),
(2) Date: Aug. 17, 2017

(87) PCT Pub. No.: WO2016/134992
PCT Pub. Date: Sep. 1, 2016

(65) Prior Publication Data
US 2018/0035517 A1 Feb. 1, 2018

(30) Foreign Application Priority Data
Feb. 26, 2015 (EP) ..................................... 15156785

(51) Int. Cl.
*H05B 37/02* (2006.01)
*H05B 37/03* (2006.01)
(Continued)

(52) U.S. Cl.
CPC ..... *H05B 37/0272* (2013.01); *H05B 37/0218* (2013.01); *H05B 37/034* (2013.01);
(Continued)

(58) Field of Classification Search
CPC ............ H05B 37/0245; H05B 37/0254; H05B 41/3925; H05B 41/391; H05B 41/2828;
(Continued)

(56) References Cited

U.S. PATENT DOCUMENTS

| 2003/0015478 A1 | 1/2003 | Kuennen et al. |
| 2006/0055248 A1 | 3/2006 | Archdekin et al. |

(Continued)

FOREIGN PATENT DOCUMENTS

| CN | 102404916 A | 4/2012 |
| WO | 2006114730 A2 | 11/2006 |
| WO | 2009029960 A2 | 3/2009 |
| WO | 2011057343 A1 | 5/2011 |

*Primary Examiner* — Douglas W Owens
*Assistant Examiner* — Syed M Kaiser

(57) ABSTRACT

The present invention relates to a driver module for use in a light fixture, especially an outdoor light fixture. The driver module is arranged for wirelessly powering a further module and for transmitting data from and/or to this further module. The further module can be a sensor module or a communications module. This allows for easy replacement of modules in light fixtures, late stage configuration of light fixtures and for upgradeability of light fixtures.

10 Claims, 6 Drawing Sheets

(51) Int. Cl.
  *H02J 50/12*    (2016.01)
  *F21Y 115/10*   (2016.01)
  *F21S 8/08*     (2006.01)
  *F21W 131/103*  (2006.01)

(52) U.S. Cl.
  CPC ........ *F21S 8/086* (2013.01); *F21W 2131/103* (2013.01); *F21Y 2115/10* (2016.08); *H02J 50/12* (2016.02)

(58) Field of Classification Search
  CPC ............ H05B 33/0803; H05B 37/0272; H05B 33/0857; H05B 37/0218
  USPC .............................. 315/307, 224, 291, 200 R
  See application file for complete search history.

(56) References Cited

U.S. PATENT DOCUMENTS

| | | | |
|---|---|---|---|
| 2008/0290822 A1 | 11/2008 | Greene et al. | |
| 2009/0167204 A1* | 7/2009 | Beij | H05B 41/3921 315/291 |
| 2014/0214500 A1* | 7/2014 | Hudson | G06Q 30/0284 705/13 |
| 2015/0008829 A1* | 1/2015 | Lurie | H05B 37/0245 315/153 |
| 2015/0048758 A1 | 2/2015 | Carrigan et al. | |
| 2016/0057838 A1* | 2/2016 | Maros | H05B 37/0272 315/291 |
| 2017/0138562 A1* | 5/2017 | Western | F21V 3/06 |
| 2017/0296686 A1* | 10/2017 | Cole | A61L 2/10 |

\* cited by examiner

DRIVER MODULE FOR POWERING A LIGHT SOURCE AND A FURTHER MODULE

CROSS-REFERENCE TO PRIOR APPLICATIONS

This application is the U.S. National Phase application under 35 U.S.C. § 371 of International Application No. PCT/EP2016/053055, filed on Feb. 12, 2016 which claims the benefit of European Patent Application No. 15156785.6, filed on Feb. 26, 2015. These applications are hereby incorporated by reference herein.

FIELD OF THE INVENTION

The present invention relates to a driver module, for use in a light fixture, especially an outdoor light fixture, arranged for powering a light source and a further module. The invention further relates to a communications and a sensor module arranged for being powered by the driver module, to a light fixture comprising the driver module and to a method for powering a light source (module) and a further module.

BACKGROUND OF THE INVENTION

Light fixtures, such as street lights, can be controlled to provide light output at desired moments (e.g. during specific times) or under certain conditions (e.g. if the ambient light level drops below a predetermined threshold). There are street lights that are commissioned on-site (e.g. by using dip-switches) or in the factory (e.g. by programming an Electrically Erasable Programmable Read-Only-Memory). These types of light fixtures provide limited flexibility for changing the control features after they have been installed. There are also street lights that have communication facilities (e.g. a connection to a cellular data network) that allow control features to be set remotely after installation. At a higher cost compared to street lights without communication facilities, these street lights with communication facilities provide increased flexibility. When, for example, a city purchases new street lighting, a one-time investment decision between these types of light fixtures has to be made. There is a need for a solution that offers further options in balancing cost and control features of light fixtures.

SUMMARY OF THE INVENTION

The inventors have realized that in modern light fixtures, such as street lights, Light Emitting Diode (LED) based light sources are used that have a lifespan with an increased longevity compared to traditional light sources (e.g. incandescent lamps). This comes at a higher initial investment cost, yet lower operational costs. Such modern light fixtures are expected to be used for an extended period of time. As such, it becomes desirable to upgrade or replace components in the light fixture over time. As an example, a more advanced daylight sensor can become available allowing improved control over the light source through daylight harvesting or an outdated communications technology is no longer supported or becomes prohibitively expensive to use. Also, a city installing these light fixtures might want to spread the investment costs over time and therefore roll out scheduled upgrades based on an investment plan. A solution proposed by the inventors in view of this realization is a modular system, adapted to be used in (outdoor) light fixtures allowing modular addition of features. This allows, for example, an outdated communications module to be replaced and the purchase and installation of a sensor module to be performed at a later date than the installation of the light fixture in which the sensor module is placed.

It is an object of the present invention to provide a driver module for powering a light source and a further module. It is a further object of the invention to provide a communications module and a sensor module to be powered by the driver module, to provide a light fixture comprising the driver module and to provide a method for powering, through a driver module, a light source (module) and a further module.

According to a first aspect of the invention, a driver module is provided. The driver module is arranged for being received by a light fixture and for powering a light source and a further module. The driver module comprises a driver arranged for powering the light source, a driver module enclosure, a power input terminal, a power output terminal, a wireless power transmitter circuit and an intra-module communications circuit. The light source powered by the driver can, for example, be a light source module arranged for being received by a light fixture or a light source embedded in a light fixture. In powering the light source, the driver can simply provide power to have the light source emit light (i.e. turn on/off), or the driver can control a dim level of the light source, or, as a further more advanced example, the driver can control various aspects of the light output of the light source, such as the color of the light emitted, the beam pattern or angle of the light emitted or the driver can embed coded light in the (in)visible spectrum of the light emitted.

The driver enclosure at least partially encapsulates the driver and has at least one ingress protecting surface area arranged for providing ingress protection for at least the driver when the driver module is received by the light fixture. The driver enclosure can thus be a full enclosure or, for example, have an opening that is closed off when the driver module is received by the light fixture (e.g. when the driver module is installed in the light fixture). Ingress protection can be provided at various levels, for example: preventing large objects from entering the enclosure through the surface area, preventing dust from reaching the driver or providing a waterproof enclosure.

The power input terminal is arranged for receiving an input power from the light fixture. As an example, there can be a connection to a power grid at the base of a street light and internal cabling provides this power to the power input terminal of the driver module. The driver is arranged for providing through the power output terminal a first output power to the light source. The wireless power transmitter circuit is arranged for wirelessly transferring a second output power through a part of the ingress protecting surface area to the further module. In various embodiments a single driver provides both the first and the second output power, or separate circuits each provide one of the first and the second output power. The wireless power transmission can, for example, make use of a capacitive power coupling, non-radiative/near-field inductive power coupling or a radiative/far-field/power beaming based inductive power coupling. Each method of wireless power transfer has its own advantages.

The intra-module communications circuit is arranged for wirelessly transmitting data between the driver and the further module. Data transmission can, for example, be one-way transmission (i.e. from the driver module to the further module, or from the further module to the driver module) or two-way transmission (i.e. both from the driver module to the further module and from the further module to the driver module). As an example, data transmitted can relate to the driver module identifying itself to the further module (or vice versa) such that further module is aware of the capabilities of the driver module (or vice versa), or the modules can exchange control information such that the second output power is controlled or such that the light output of the light source is controlled.

Beneficially, the driver module according to the invention allows that a light fixture can be modularly expanded with one or more further modules and/or that individual further modules are easily replaceable (e.g. when broken, when technologically outdated, when at the end of their economic lifespan).

In an embodiment of the driver module according to the invention, the power output terminal is a conductive power output terminal, arranged for providing the first output power to the light source through conductive power transfer. Electrical energy transfer losses can be minimized by conductively transferring the electrical energy from the driver to the light source.

In a further embodiment of the driver module according to the invention, the wireless power transmitter circuit is an inductive power transfer circuit, arranged for inductively transferring the second output power through the first surface area to the further module. Advantageously, this allows for transferring a relatively large amount of power through a small surface area compared to capacitive wireless power transfer. Furthermore the distance between transmitter and receiver elements in the wireless power transfer configuration of the driver module and the further module can be relatively large compared to capacitive wireless power transfer.

In yet a further embodiment of the driver module according to the invention, the intra-module communications circuit is an inductive communications circuit, arranged for inductively transmitting data between the driver and the further module, and optionally the inductive power transfer circuit is additionally arranged to inductively transmit data between the driver and the further module. This is beneficial as power and data are transferred through the same circuit (e.g. the same coils), which can require less components and as a result provide cost benefits and/or allow more efficient use of space in the driver module.

In an especially advantageous embodiment of the driver module according to the invention, the intra-module communications circuit comprises a Near Field Communications (NFC) tag. Such a tag can comprise control data that is stored in the tag as part of a late stage configuration process. The control data can, for example, relate to on/off times for controlling the light source according to a timing schedule (e.g. turn light source on at 10 PM and off at 7 AM). The late stage configuration can take place in the factory where the driver module is made or in the field when the driver module is installed. This same NFC tag can then additionally or alternatively be programmed over the intra-module communications circuit. As a first example, a communications module coupled to the driver module can transmit data to alter the on/off times that are stored in the NFC tag (e.g. when changing from a winter to a summer light source control program) or, as a second example, the on/off times can be uploaded to the driver module after installation avoiding the need to provide such configuration data at an earlier stage.

According to a second aspect of the invention, a communications module is provided. The communications module is arranged for being received by a light fixture comprising the driver module according to the first aspect of the invention. The communications module comprises: a module-to-device communications circuit, a communications module enclosure, a wireless power receiver circuit and an intra module communications circuit. The module-to-device communications circuit is arranged for communicating with a device external to the light fixture, such as through a wired or wireless communications network (e.g. Ethernet, Wi-Fi, ZigBee, Bluetooth, GPRS, EDGE). As an example, the external device can be a region controller arranged for controlling a number of light fixtures and transmitting control information for the communications module to receive. Data received through the module-to-device communications circuit can be passed on to the driver or can be processed and serve as a basis for sending control commands to the driver module. In another example, the communications module allows status information relating to the driver module, or another module to which the communications module is operationally coupled, to be sent to an external device. This can allow a central server to capture operational information on various light fixtures, such as operational status and power consumption, and plan maintenance or calculate (predicted) cost levels.

The communications module enclosure at least partially encapsulates the module-to-device communications circuit and has at least one ingress protecting surface area arranged for providing ingress protection for at least the module-to-device communications circuit when the communications module is received by the light fixture. The wireless power receiver circuit is electrically coupled to the module-to-device communications circuit and is arranged for wirelessly receiving power from the driver module. The intra module communications circuit is arranged for wirelessly transmitting data between the communications module and the driver module. Such a communications module can be installed in a light fixture comprising the driver module according to the first aspect of invention, allowing a light fixture without a feature allowing communication to an external device to be upgraded. Furthermore, the communications module can be replaced when a legacy technology (e.g. sending lighting control commands as text messages on a mobile phone network) becomes expensive to operate and a new technology (e.g. data communications over a mobile phone network) is selected as a replacement.

In an embodiment of the communications module according to the invention, the communications module further comprises a sensor circuit, electrically coupled to the wireless power receiver circuit. The sensor circuit is arranged for determining a sensed value and the data wirelessly transmitted between the communications module and the driver module is based on the sensed value. Advantageously this allows a single module to comprise both communications and sensing functions.

In a further embodiment of the communications module according to the invention, the communications module comprises: a wireless power transmitter circuit and an intra-module communications circuit. The wireless power transmitter circuit is arranged for wirelessly transmitting an output power through the surface area of the communications module enclosure to a sensor module, and the intra-module communications circuit is arranged for transmitting data between the module-to-device communications circuit and a sensor module. This is beneficial as it allows a sensor module to be coupled to the communications module.

According to a third aspect of the invention, a sensor module is provided. The sensor module is arranged for being received by a light fixture comprising a driver module according the first aspect of the invention. The sensor module comprises: a wireless power receiver circuit, a sensor circuit, a sensor module enclosure and an intra module communications circuit. The wireless power receiver circuit is electrically coupled to the sensor circuit, and is arranged for wirelessly receiving power from the driver module. The sensor circuit is electrically coupled to the wireless power receiver circuit, and arranged for determining a sensed value. Examples of sensor (circuits) are: presence sensors, daylight sensors, movement sensors, GPS units, gyroscopes, air quality sensors, etc. The sensor module enclosure at least partially encapsulates the sensor circuit and has at least one ingress protecting surface area arranged for providing ingress protection for at least the wireless power receiver circuit when the sensor module is received by the light fixture. The intra module communications circuit is arranged for wirelessly transmitting data, based on the sensed value, between the sensor module and the driver module. This allows control of the light source by the driver based on the sensed value, for example, turning the light source on when presence of a person is detected. Alternatively or in addition the data can be received by the communications module, such that, for example, this data can be centrally processed or analyzed.

In an embodiment of the sensor module according to the invention, the sensor module is being received by a light fixture comprising a driver module according the first aspect of the invention and further comprising a communications module according to the second aspect of the invention, where the sensor module comprises: a wireless power receiver circuit, a sensor circuit, a sensor module enclosure and an intra module communications circuit. The wireless power receiver circuit is electrically coupled to the sensor circuit and is arranged for wirelessly receiving power from the communications module. The sensor circuit is electrically coupled to the wireless power receiver circuit, and is arranged for determining a sensed value. The sensor module enclosure at least partially encapsulates the sensor circuit, and has at least one ingress protecting surface area arranged for providing ingress protection for at least the wireless power receiver circuit when the sensor module is received by the light fixture. The intra module communications circuit is arranged for wirelessly transmitting data, based on the sensed value, between the sensor module and the communications module.

In a further embodiment of the sensor module according to the invention, the sensor module further comprises: a wireless power transmitter circuit and an intra-module communications circuit. The wireless power transmitter circuit is arranged for wirelessly transmitting an output power through the surface area of the sensor module enclosure to a further module; and the intra-module communications circuit is arranged for transmitting data between the sensor module and the further module. This embodiment advantageously allows a further module, such as another sensor module, to be powered. As an example, a street light with a daylight sensor installed can then at a later stage be additionally equipped with a presence sensor.

According to a fourth aspect of the invention, a light fixture is provided, comprising a driver module according to the first aspect of the invention and a light source.

According to a fifth aspect of the invention, a method for powering a light source and a further module, through a driver module received by a light fixture, is provided. The method comprises: transferring, through conductive power transfer, an input power received from a power output terminal of the light fixture to a power input terminal of the driver module; transforming the power received over the power input terminal of the driver module to a first output power for powering the light source and to a second output power for powering the further module; transferring, through conductive power transfer, the first output power from the driver module to the light source; and transferring, through wireless power transfer, the second output power from the driver module to the further module.

In an embodiment of the method according to the invention, the method further comprises: transmitting, through wireless communications, an information signal received from the further module to the driver module; and controlling the first output power such that the light output of the light source is based on the received information signal.

It shall be understood that the driver module according to the first aspect of the invention, the communications module according to the second aspect of the invention, the sensor module according to the third aspect of the invention, the light fixture according to the fourth aspect of the invention and the method according to the sixth aspect of the invention have similar and/or identical preferred embodiments, in particular, as defined in the dependent claims.

It shall be understood that a preferred embodiment of the invention can also be any combination of the dependent claims or above embodiments with the respective independent claim. This includes arrangements comprising a driver module according to the first aspect of the invention and a further module, such as the communications module and/or the sensor module according to respectively the second and third aspects of the invention.

These and other aspects of the invention will be apparent from and elucidated with reference to the embodiments described hereinafter.

DETAILED DESCRIPTION OF EMBODIMENTS

Figure 1:
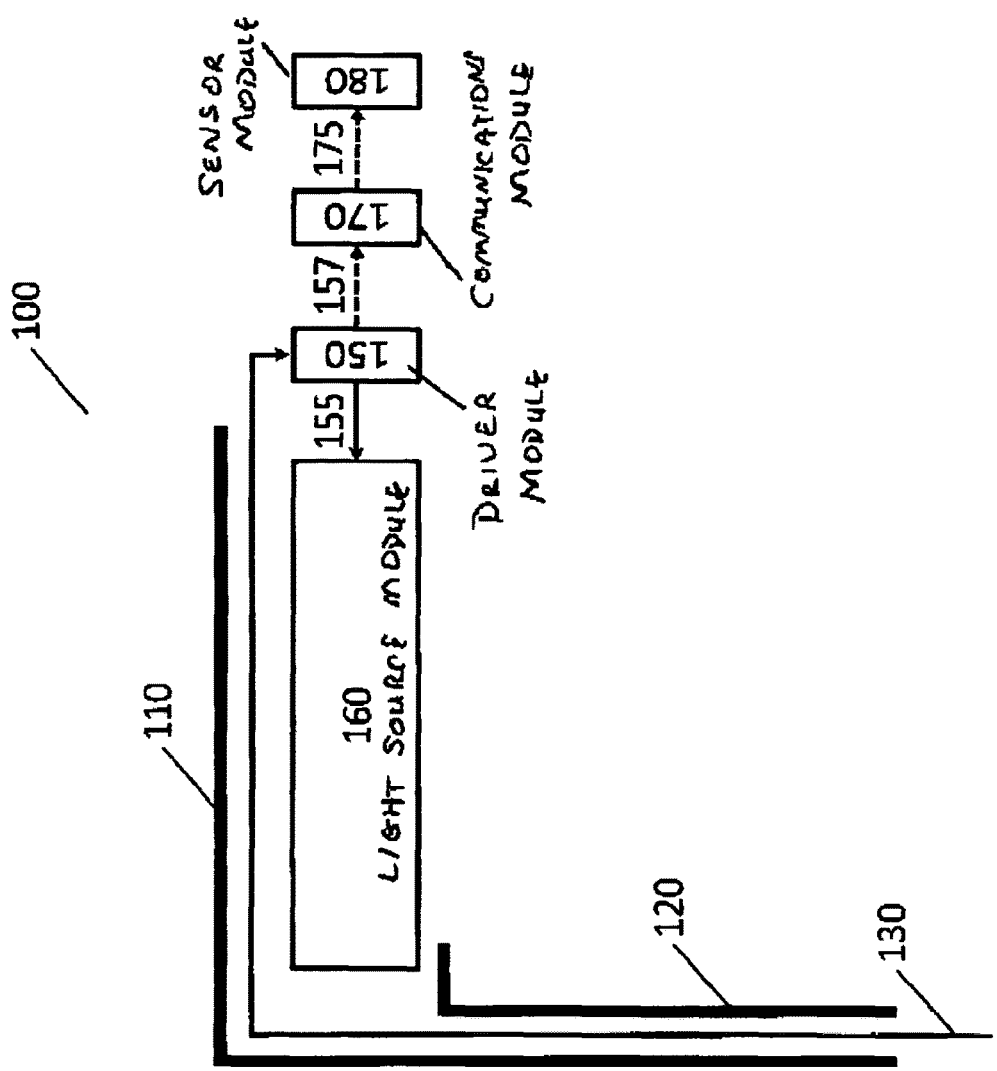
FIG. 1 shows schematically and exemplarily a light fixture comprising a driver module, a communications module and a sensor module according to the invention.

In FIG. 1 a light fixture 100 is shown, comprising a light fixture head 110 and a light fixture pole 120 through which a power supply cable 130 runs to a driver module 150. The driver module provides power over a (e.g. conductive) power coupling 155 to a light source module 160 and further provides power over a wireless (e.g. inductive or capacitive) power coupling 157 to a communications module 170. The communications module further provides power over a further wireless power coupling 175 to a sensor module 180.

Figure 2:
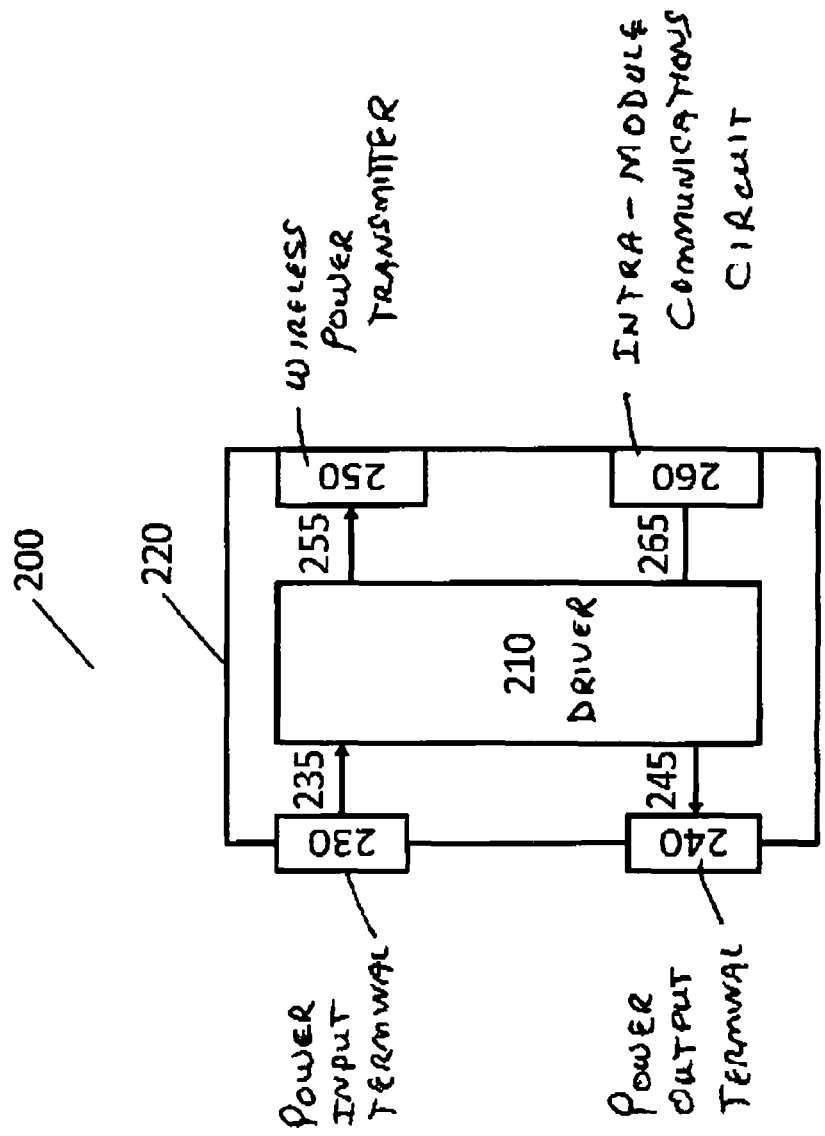
FIG. 2 shows schematically and exemplarily a driver module according to the invention.

FIG. 2 shows an embodiment of a driver module 200 according to the invention, the driver module comprising a driver 210 enclosed in a driver module enclosure 220. The driver module 200 further comprises a power input terminal 230 for transferring received power over an electrical coupling 235 to the driver 210. The driver is arranged for powering a light source (not shown; e.g. the light source 160 in FIG. 1) through a power output terminal 240 which has an electrical coupling 245 to the driver 210. The driver 210 is further arranged for powering a wireless power transmitter 250 that has an electrical coupling 255 to the driver. An intra-module communications circuit 260 is arranged for wirelessly transmitting data between the driver 210 and a further module (not shown; e.g. the communications module in FIG. 3 or the sensor module in FIG. 4).

As an example, in a near-field inductive power coupling, a first module (e.g. the driver module) has a first (wire) coil and the second module (e.g. the communications or sensor module) has a second (wire) coil. The first (wire) coil receives power from a resonant circuit thereby providing a time varying magnetic field at a frequency of, for example, over 10 kHz. The second (wire) coil receives the power when the position of this second (wire) coil overlaps with the magnetic field generated by the first coil and optionally a circuit conditions the power before supplying it to further electronic circuitry in the module. Preferably the two coils are positioned closely together, and the overlap is maximized. Alignment can be achieved by the light fixture receiving the modules in a slot such that they are positioned to align the coils. Alternatively or additionally the respective modules can comprise mechanical interfaces, such as keying, that provide for proper alignment. Furthermore, the thickness of an ingress protecting surface area of the enclosure could be adapted to achieve a desirable balance between strength of the enclosure and minimization of the gap between the transmitter and receiver coils. The smaller the gap, the higher the power transfer efficiency. One way of limiting the gap is to embed the wire coil in the material the enclosure is made of, such as plastic.

Figures 3, 4:
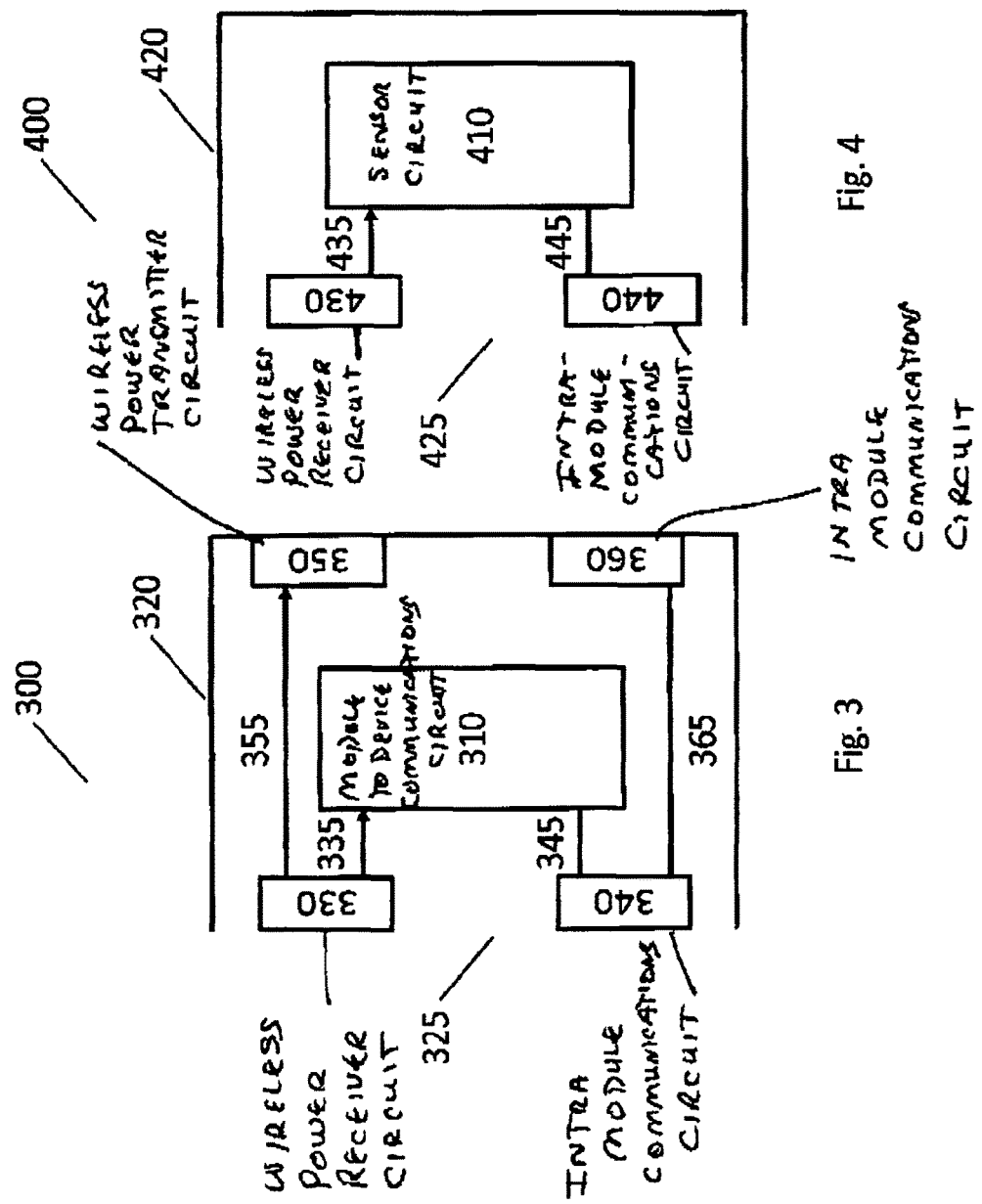
FIG. 3 shows schematically and exemplarily a communications module arranged for wirelessly receiving power from the driver module according to the invention.
FIG. 4 shows schematically and exemplarily a sensor module arranged for wirelessly receiving power from the driver module according to the invention.

FIG. 3 shows an embodiment of a communications module 300 according to the invention, the communications module comprising a module-to-device communications circuit 310 (partially) enclosed in a communications module enclosure 320 having one open end 325. When received by the light fixture (not shown; e.g. the light fixture head 110 of FIG. 1), the open end 325 can be closed off by a section of the light fixture such that the module-to-device communications circuit 310 is fully encapsulated by the combination of the communications module enclosure 320 and the light fixture. In certain embodiments it can be desirable to have a (partially) open area in the enclosure or an area made of a different material than the rest of the enclosure allowing a signal, for example a radio signal, to be received or transmitted by the module-to-device communications circuit or at least by an antenna coupled to this circuit. In an embodiment the area designed for a radio signal to enter or exit the enclosure, is the same area through which the wireless power transfer of the wireless data transmission takes place. Optionally an antenna is integrated in the enclosure or the module has a socket to allow an external antenna to be connected.

The communications module 300 further comprises a wireless power receiver circuit 330 providing the received power over an electrical coupling 335 to the module-to-device communications circuit 310. An intra module communications circuit 340 is arranged for, via an operational coupling 345, transmitting data between the module-to-device communications circuit 310 and the driver module (not shown; e.g. the driver module 200 in FIG. 2). The intra module communications circuit can, in various embodiments, allow modules to communicate in order to, for example, share data received from an external device, from a sensor or data generated related to the status of a (circuit in) a module (e.g. detected temperature; when the temperature of the communications module reaches a threshold, data is sent to the driver module such that the light source is dimmed in order to generate less heat). In an embodiment the intra module communications circuit allows a first module (e.g. a driver module) to determine what type of second module (e.g. a sensor module) it is coupled to. This information can be used to configure a module, e.g. to determine what power requirements need to be met in supplying power via the wireless power transmitter circuit.

The communications module 300 shown is arranged for powering a further module and communicating with this further module (not shown; e.g. the communications module 400 of FIG. 4). A wireless power transmitter circuit 350 receives power over an electrical coupling 355 from the wireless power receiver circuit 330. A further intra module communications circuit 360 is coupled via an operational coupling 365 to the intra module communications circuit 340.

In FIG. 4 an embodiment of a sensor module 400 according to the invention is shown, the sensor module comprising a sensor circuit 410 (partially) enclosed in a communications module enclosure 420 having one open end 425. In an embodiment it can be received by the light fixture (not shown; e.g. the light fixture head 110 of FIG. 1) such that the open end 425 is closed off by a surface of the communications module enclosure (not shown; e.g. the communications module enclosure 320 of FIG. 3). The sensor module 400 further comprises a wireless power receiver circuit 430 providing the received power over an electrical coupling 435 to the sensor circuit 410. An intra module communications circuit 440 is arranged for, via an operational coupling 445, transmitting data between the sensor circuit 410 and the driver module or the communications module (not shown; e.g. the driver module 200 in FIG. 2, the communications module 300).

In a further embodiment, not shown, the sensor module 400 shown is arranged for powering a further module (e.g. another sensor module) and communicating with this further module. In such an embodiment the sensor module would further comprise a wireless power transmitter circuit for receiving power over an electrical coupling from the wireless power receiver circuit 440, and a further intra module communications circuit coupled via an operational coupling to the intra module communications circuit 440.

Figure 5:
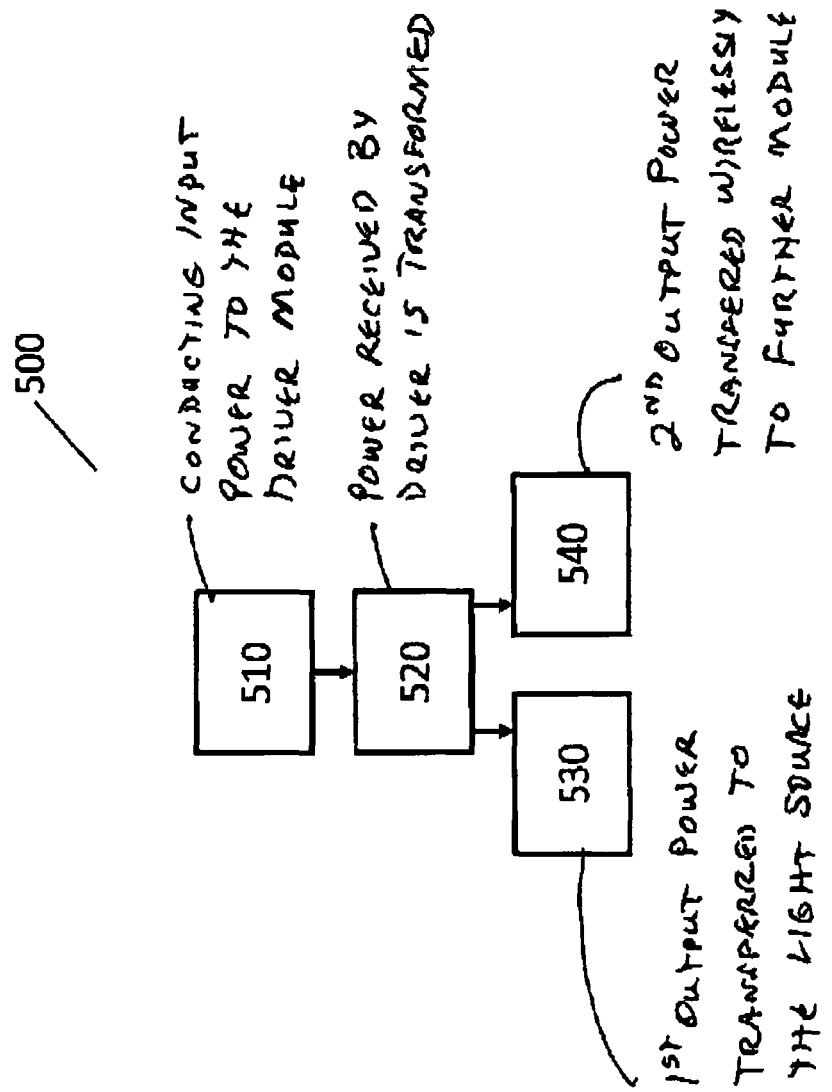
FIG. 5 shows schematically and exemplarily a method for powering a light source and a further module, through a driver module, according to the invention.

In FIG. 5 an embodiment of the method according to the invention is shown, the method for powering a light source (module) and a further module, through a driver module received by a light fixture. The method comprises a first step of conducting 510, through conductive power transfer, an input power received from a power output terminal of the light fixture to a power input terminal of the driver module. In a second step the power received over the power input terminal of the driver module is transformed 520 to a first output power for powering the light source and to a second output power for powering the further module. This power transformation can, for example, be performed in a single power converter or in multiple or staged converters. The first and second output power can be supplied, again as an example, as direct current at the same voltage, at different voltages or as alternating current for either one of both power outputs. The first output power is then transferred 530 from the driver module to the light source and the second output power is then transferred 510 from the driver module to the further module. The first output power is transferred 530 through conductive power transfer, whereas the second output power 540 is transferred through wireless power transfer. In certain embodiments the second output power is only generated when there is a demand for this power, such as when a further module has been received by the light fixture. Generation of the signals for wirelessly transferring power and/or generation of the signals for wirelessly transmitting data can be performed in, respectively, a wireless power transmitter circuit and an intra-module communications circuit. Alternatively or in addition, (a part of) the signals are generated in the driver.

Figure 6:
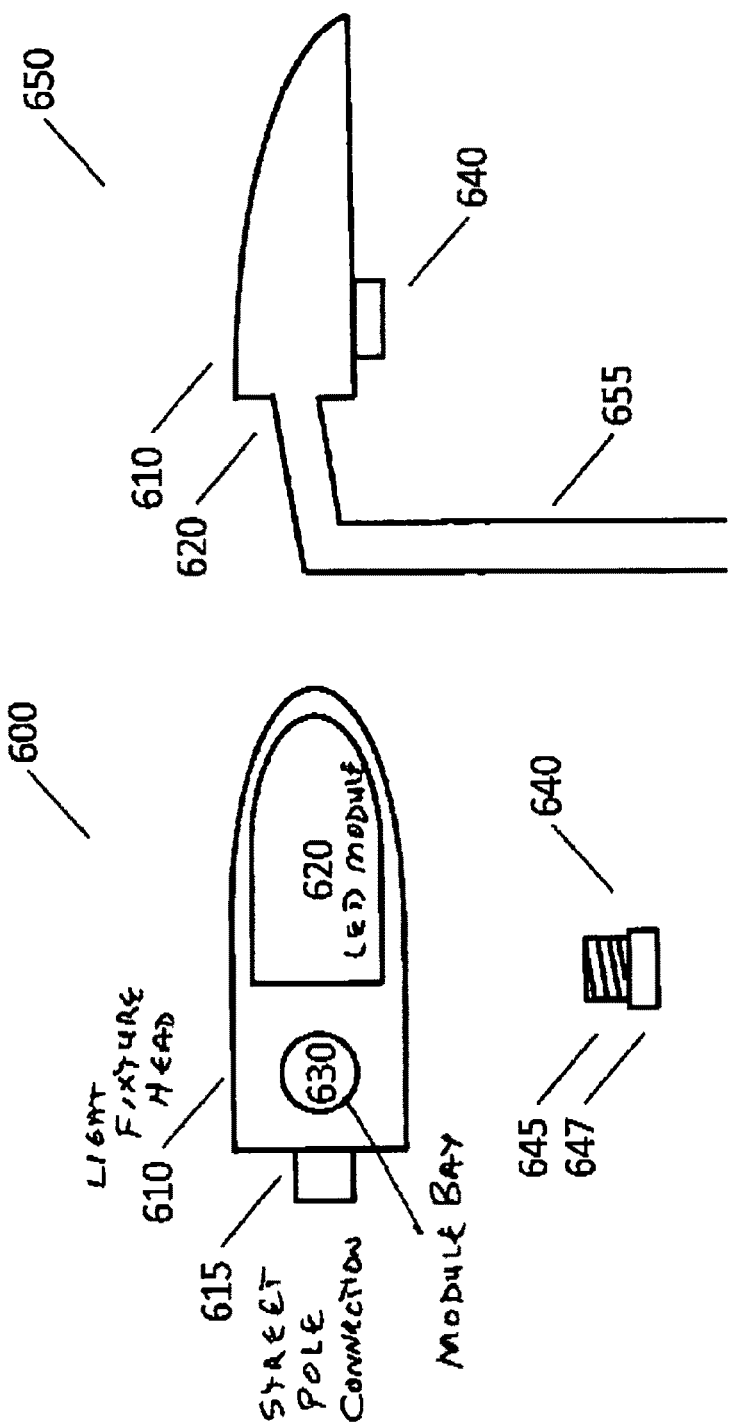
FIG. 6 shows schematically and exemplarily a street light and a sensor module.

In FIG. 6 an embodiment of a light fixture according to the invention is shown. A light fixture head and sensor module are shown in a first state 600 in which the sensor module has not yet been installed and in a second state 650 in which the sensor module has been installed in the light fixture head. In the first state 600 a light fixture head 610, comprising a street pole connector 615 (the street pole is not shown), a (light exit window of a) LED module 620 and a module bay 630 are shown; as well as a sensor module 640 comprising a first section 645 arranged to be screwed into the module bay 630 and a second section 647 arranged for remaining on the outside of the light fixture head 610 upon installation. In the second state 650, the sensor module 640 has been installed in the light fixture head 610 (the light fixture head is shown here coupled to the street pole 655). The position of the module bay 630 and the manner in which the sensor module 640 is received in the module bay 360 are mere examples, as in various other options the sensor module 640 can be placed on top of the light fixture head 610, on any side of the light fixture head 610, etc. Although only one module bay 630 is shown, in other embodiments the light fixture head 610 can comprise multiple module bays. In this figure the driver module arranged for powering the LED module 620 and the sensor module 640 is inside the light fixture head 610 (the power input and output terminals as well as the intra-module communications circuit are not shown).

Figure 7:
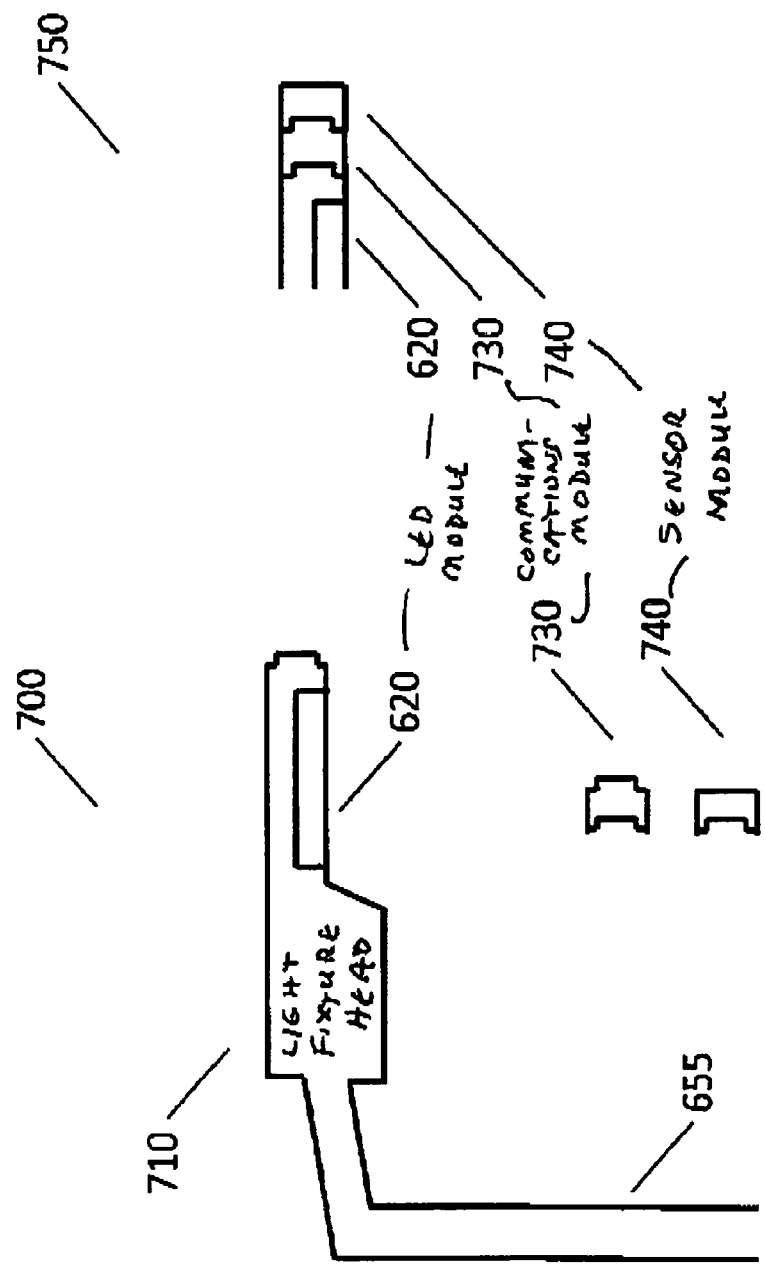
FIG. 7 shows schematically and exemplarily a street light, a communications and a sensor module.

In FIG. 7 a further embodiment of a light fixture according to the invention is shown. Again a first state 700 wherein the modules have not yet been installed and a second state 750 (which is a close up of the light fixture head) in which the modules have been installed are shown. In this embodiment the light fixture head 710 is arranged to receive a module as an 'end-cap'. The light fixture head 710 has a keying feature that allows a module, such as the communications module 730, to be received. In this embodiment the communications module 730 has further keying features that allow another module, in this embodiment a sensor module 740, to be received by the communications module. The communications module 730 and the sensor module 740 are installed as end-caps on the light fixture head 710 in the second state 750. In this figure the driver module arranged for powering the LED module 620 and the communications module 730 and the sensor module 740 is inside the light fixture head 610 (the power input and output terminals as well as the intra-module communications circuit are not shown, neither are the features described elsewhere related to power transfer and data transmission between the communications module 730 and the sensor module 740). Although in this embodiment two modules are attached to the light fixture head 710 as end-caps, there could be only a single or more than two of these end-caps installed.

The invention claimed is:

1. A light fixture comprising a light source, a driver module and a sensor module, the driver module comprising:
   a driver arranged for powering the light source,
   a driver module enclosure, at least partially encapsulating the driver, having at least one ingress protecting surface area and arranged for providing ingress protection for at least the driver,
   a power input terminal, electrically coupled to the driver, arranged for receiving an input power from the light fixture, a power output terminal, electrically coupled to the driver, arranged for providing a first output power to the light source through conductive power transfer,
   a wireless power transmitter circuit arranged for wirelessly transferring a second output power through a part of the ingress protecting surface area to the sensor module, thereby providing operating power to the sensor module;
   an intra-module communications circuit, arranged for wirelessly transmitting data between the driver and the sensor module;
   a communications module, the communications module including,
      a module-to-device communications circuit, arranged for communicating with a device external to the light fixture,
      a communications module enclosure, at least partially encapsulating the module-to-device communications circuit, having at least one ingress protecting surface area and arranged for providing ingress protection for at least the module-to-device communications circuit,
      a wireless power receiver circuit, electrically coupled to the module-to-device communications circuit, arranged for wirelessly receiving power from the driver module; and
      a first communications module intra module communications circuit, arranged for wirelessly transmitting data between the communications module and the driver module;
      a communications module wireless power transmitter circuit arranged for wirelessly transmitting an output power through the surface area of the communications module enclosure to a sensor module; and
      a second communications module intramodule communications circuit, arranged for transmitting data between the module-to-device communications circuit and the sensor module.

2. The light fixture according to claim 1, wherein the data transmitted between the driver and the sensor module is based on a determined sensor value; and wherein the driver is further arranged for controlling the light source based on the data.

3. The light fixture according to claim 1, wherein the wireless power transmitter circuit is an inductive power transfer circuit, arranged for inductively transferring the second output power through the first surface area to the sensor module.

4. The light fixture according to claim 1, wherein the intra-module communications circuit is an inductive communications circuit, arranged for inductively transmitting data between the driver and the sensor module.

5. The light fixture according to claim 3, wherein the inductive power transfer circuit further arranged to function as the intra-module communications circuit.

6. The light fixture according to claim 1, wherein the intra-module communications circuit comprises a Near Field Communications tag.

7. The light fixture according to claim 1, wherein the communication module further comprises:
- A sensor circuit, electrically coupled to the wireless power receiver circuit, the sensor circuit arranged for determining a sensed value; and
- wherein the data wirelessly transmitted between the communications module and the driver module is based on the sensed value.

8. The light fixture according to claim 1, wherein the sensor module comprises:
- a wireless power receiver circuit, electrically coupled to a sensor module sensor circuit, arranged for wirelessly receiving power from the driver module, and arranged for determining a sensed value,
- a sensor module enclosure, at least partially encapsulating the sensor circuit, having at least one sensor module ingress protecting surface area and arranged for providing ingress protection for at least the wireless power receiver circuit when the sensor module is received by the light fixture; and
- a sensor module intra module communications circuit, arranged for wirelessly transmitting data, based on the sensed value, between the sensor module and the driver module.

9. The light fixture according to claim 7, wherein the sensor module comprises:
- a sensor module wireless power receiver circuit, electrically coupled to the sensor circuit, arranged for wirelessly receiving power from the communications module,
- a sensor module sensor circuit, electrically coupled to the wireless power receiver circuit, the sensor circuit arranged for determining a sensed value,
- a sensor module enclosure, at least partially encapsulating the sensor circuit, having at least one sensor module ingress protecting surface area and arranged for providing ingress protection for at least the wireless power receiver circuit; and
- a sensor module intra module communications circuit, arranged for wirelessly transmitting data, based on the sensed value, between the sensor module and the communications module and/or the driver module.

10. A method for powering a light source comprised in a light fixture, the light fixture further comprising a driver module, a sensor module and a communications module, the method comprising:
- transferring, through conductive power transfer, an input power received from a power output terminal of the light fixture to a power input terminal of the driver module,
- transforming the power received over the power input terminal of the driver module to a first output power for powering the light source and to a second output power for powering the sensor module,
- transferring, through conductive power transfer, the first output power from the driver module to the light source,
- transferring, through wireless power transfer, the second output power from the driver module to the sensor module, thereby providing operating power to the sensor module,
- transmitting, through wireless communications, an information signal received from the sensor module to the driver module,
- controlling the first output power such that the light output of the light source is based on the received information signal;
- wirelessly communicating with a device external to the light fixture, wherein communication with the device includes, wirelessly receiving power from the driver module, wirelessly transmitting data between the communications module and the driver module, wirelessly transmitting an output power through the communications module to a sensor module, transmitting data between the device and the sensor module.

* * * * *